W. H. AUSTIN.
AUTOMOBILE LOCK.
APPLICATION FILED NOV. 21, 1919.
1,358,813.
Patented Nov. 16, 1920.
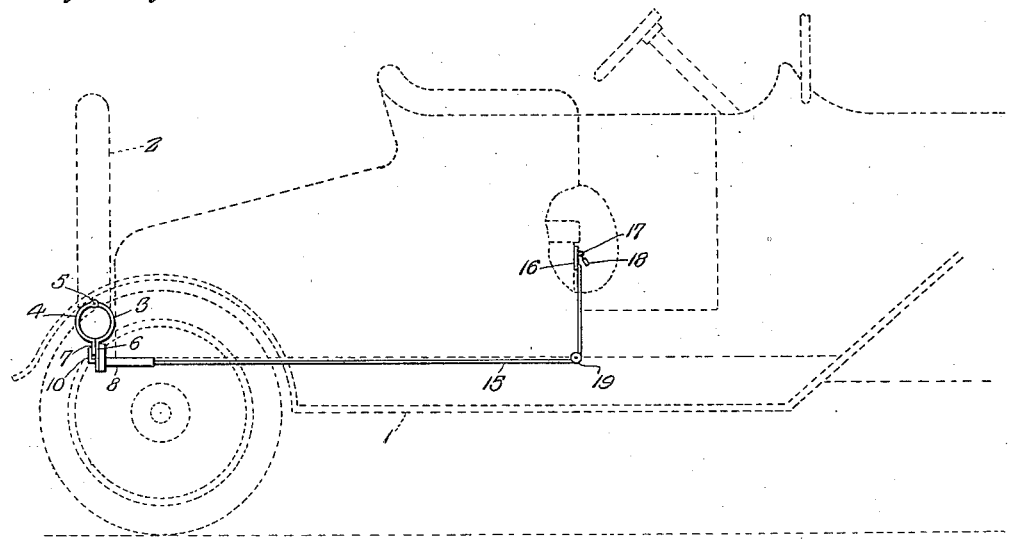
Fig. 1
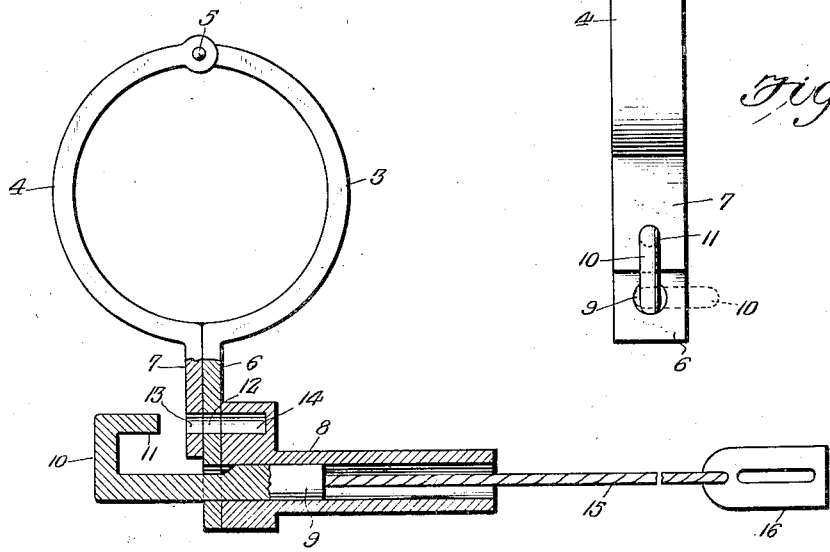
Fig. 2
Fig. 3
WITNESSES
INVENTOR
W. H. Austin,
BY
ATTORNEYS

UNITED STATES PATENT OFFICE.

WILLIAM HENRY AUSTIN, OF GREENVILLE, SOUTH CAROLINA.

AUTOMOBILE-LOCK.

1,358,813.   Specification of Letters Patent.   Patented Nov. 16, 1920.

Application filed November 21, 1919. Serial No. 339,628.

*To all whom it may concern:*

Be it known that I, WILLIAM HENRY AUSTIN, a citizen of the United States, and a resident of Greenville, in the county of Greenville and State of South Carolina, have invented certain new and useful Improvements in Automobile-Locks, of which the following is a specification.

My invention is an improvement in automobile locks, and has for its object to provide mechanism of the character specified, for locking the spare tire of a motor vehicle to the body, in such manner that it cannot be removed by unauthorized parties.

In the drawings:

Figure 1 is a side view of the improved lock nut in use,

Fig. 2 is a side view of the clamp with parts in section,

Fig. 3 is a rear view of the clamp.

The present embodiment of the invention is shown in connection with a motor vehicle 1 of usual construction having a spare tire 2 supported at the rear thereof, and a lock is mounted on the body of the vehicle at the rear, and in position to engage the tire to hold it to the body.

The improved lock comprises a clamp consisting of a relatively fixed section 3, and a movable section 4 hinged to the fixed section at 5. The sections coöperate to form a circle when closed, of sufficient diameter to engage about the spare tire and the rim, when the tire is mounted on a rim, and each of the sections 3 and 4 has a radial lug 6 and 7, respectively at their meeting ends.

A casing 8 is secured to the lug 6 of the section 3 and to the body of the vehicle, and this casing is tubular to receive a sliding bolt 9. The bolt has an angular portion 10 provided with a locking pin 11 extending substantially parallel with the body of the bolt, and this locking pin is adapted to pass through registering openings 12 and 13 in the lugs 6 and 7 and engaged within a recess 14 in the casing 8.

When the bolt is moved so that the locking pin moves into the registering openings 12—13—14, it will be obvious that the section 4 cannot be opened to release the spare tire. On the other hand, when the bolt is moved rearwardly and turned into the dotted line position of Fig. 3, the section 4 will swing away from the section 3 to release the tire.

Any preferred form of locking means may be used in connection with the bolt. In the present instance a flexible member 15, as for instance, a cord or wire is connected at one end with the bolt and at the other with a hasp 16 which is adapted to engage a staple 17 at the front of the seat of the vehicle. This staple may be engaged by the shackle of a padlock 18 to prevent disengagement of the hasp. The length of the flexible member 15 is such that when the hasp is engaged with the staple, the locking pin will be tightly held in the registering openings 12—13—14.

A direction element 19 is provided for guiding the flexible member. The improved lock is especially adapted for use with the lock forming the subject matter of my Patent 1,315,003 granted September 2, 1919.

I claim:

A lock for a spare tire consisting of a casing adapted to be secured to a vehicle, a clamp consisting of sections shaped to fit about the tire and hinged together, at one end, said sections having at the other end radial lugs abutting when the sections are closed on the tire, the radial lug of one section being secured to the casing and the said lugs having openings registering with each other, the casing having a recess registering with the openings, and a locking bolt slidable in the casing, said bolt having a locking pin offset laterally therefrom for engaging the openings and the recess.

WILLIAM HENRY AUSTIN.

Witnesses:
B. B. MILLS,
R. A. GAITHER.